(12) United States Patent
Miyashita et al.

(10) Patent No.: US 7,358,638 B2
(45) Date of Patent: Apr. 15, 2008

(54) METHOD OF DETERMINING POLE ARC RATIO OF INTERIOR PERMANENT MAGNET ROTARY MOTOR AND INTERIOR PERMANENT MAGNET ROTARY MOTOR

(75) Inventors: Toshihito Miyashita, Tokyo (JP); Satoru Onodera, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 296 days.

(21) Appl. No.: 11/051,530

(22) Filed: Feb. 4, 2005

(65) Prior Publication Data

US 2005/0168089 A1    Aug. 4, 2005

(30) Foreign Application Priority Data

| Feb. 4, 2004 | (JP) | ............................. 2004-028515 |
| Jun. 30, 2004 | (JP) | ............................. 2004-194149 |

(51) Int. Cl.
   *H02K 21/12*    (2006.01)

(52) U.S. Cl. ............................. 310/156.57; 310/156.53

(58) Field of Classification Search ........... 310/156.53, 310/156.57
See application file for complete search history.

(56) References Cited

U.S. PATENT DOCUMENTS

| 6,034,459 | A | 3/2000 | Matsunobu et al. |
| 6,208,054 | B1 | 3/2001 | Tajima et al. |
| 6,486,581 | B2 | 11/2002 | Miyashita et al. |
| 6,597,079 | B2 | 7/2003 | Miyashita et al. |
| 6,727,623 | B2 * | 4/2004 | Horst et al. ............. 310/156.57 |
| 6,867,526 | B2 * | 3/2005 | Mori et al. ............. 310/156.57 |
| 2004/0017123 | A1 | 1/2004 | Miyashita et al. |

FOREIGN PATENT DOCUMENTS

| DE | 10219332 | 12/2002 |
| EP | 0909009 | 4/1999 |
| EP | 0991166 | 4/2000 |

(Continued)

OTHER PUBLICATIONS

XP-002355117, Optimierte Auslegung einer Modularen Dauermagnetmachine fur ein Autarkes Hybridfahrzeug, Bernhard Krasser, Lehrstuhl fur Elektrische Maschinen und Gerate, Aug. 22, 2000.

*Primary Examiner*—Dang Le
(74) *Attorney, Agent, or Firm*—Rankin, Hill & Clark LLP

(57) ABSTRACT

An interior permanent magnet rotary motor of the present invention has N slots and P permanent magnet magnetic pole sections, ($2/3 <= P/N <= 43/45$). Po is an irreducible fraction Po/No of the P/N is an odd number, and a pole arc ratio $\psi_p$ equals θpp/θp. θpp is an angle between two line segments assumed for a pair of flux barriers, each of which connects the center of a rotor core and one of corners of the section of each flux barrier that is closest to the surface of the rotor core. θp is an angle obtained by dividing 360° by the number of the permanent magnet pole sections. The pole arc ratio indicated by $\Psi_p$ (0<4n<1) is determined by the expression of $\Psi_p = 2mP/N + P/4LCM\,(P, N) - 2n$, where LCM (P, N) is the least common multiple between P and N, m and n are arbitrary natural numbers.

12 Claims, 7 Drawing Sheets

FOREIGN PATENT DOCUMENTS

| | | |
|---|---|---|
| EP | 1365338 | 12/2002 |
| EP | 1296437 | 3/2003 |
| EP | 1487089 | 12/2004 |
| JP | 07-147745 | 6/1995 |
| JP | 11-308831 | 11/1999 |
| JP | 2000-253633 | 9/2000 |
| JP | 2002-315243 | 10/2002 |
| JP | 2003-284275 | 10/2003 |
| JP | 2003-319584 | 11/2003 |
| JP | 2004-056871 | 2/2004 |
| WO | 0235683 | 5/2002 |
| WO | 03/085807 | 10/2003 |

\* cited by examiner

METHOD OF DETERMINING POLE ARC RATIO OF INTERIOR PERMANENT MAGNET ROTARY MOTOR AND INTERIOR PERMANENT MAGNET ROTARY MOTOR

BACKGROUND OF THE INVENTION

The present invention relates to a method of determining the pole arc ratio of an interior permanent magnet rotary motor and the interior permanent magnet rotary motor.

Generally, there is known a permanent magnet rotary motor constituted from an armature that creates a shifting magnetic field and a magnetic field system constituted from permanent magnets that act with the shifting magnetic field to generate an electromagnetic force. However, in the motor that uses the permanent magnets as described above, pulsating torque (cogging torque) and a thrust are produced at the time of no-load operation. Such cogging torque hinders smooth rotation or reciprocation of the motor, thus causing vibration and speed variation of the motor. As an approach to reducing the cogging torque, there have been hitherto proposed formation of a slot with an oblique groove, hereinafter referred to as a skew, in a stator or a rotor, or use of a permanent magnet having the shape of a sector with the center of an inner circular arc thereof not aligned with the center of an outer circular arc thereof, hereinafter referred to as the permanent magnet of an eccentric type. However, formation of the skew may reduce the torque or reduce the productivity of the motor. Further, use of the permanent magnet of the eccentric type cannot increase the magnetic flux density of the motor, so that higher torque density cannot be achieved.

Then, in the interior permanent magnet rotary motor disclosed in Japanese Patent Application Laid-Open Publication No. 299199/1999 (Patent Document 1), in which permanent magnets are embedded within a rotor core to form permanent magnet magnetic pole sections, setting of the following condition was proposed:

$$\theta \approx n \times \tau s + 16/P$$

in which an angle formed between two line segments each of which connects the center of the rotor and one of the corners in the peripheral direction of each permanent magnet magnetic section located on the side of the surface of the rotor core, or a permanent magnet angle is indicated by $\theta$. Then, a slot pitch is indicated by $\tau s$, and the number of the permanent magnet magnetic pole sections is indicated by P, and n is a natural number.

However, in the conventional setting, though the torque caused by the permanent magnets, referred to as the magnet torque, can be maintained to be high, the width dimension of each permanent magnet that extends in a direction orthogonal to the diameter direction of the rotor core will be increased. Thus, the amount of the permanent magnets used will be increased, so that the cost of material will be increased.

An object of the present invention is therefore to provide a method of determining the pole arc ratio of an interior permanent magnet rotary motor and the interior permanent magnet rotary motor that can reduce cogging torque and also can reduce the amount of permanent magnets used, without reducing torque.

SUMMARY OF THE INVENTION

An internal permanent magnet rotary motor, the improvement of which is aimed at by the present invention, includes a stator having a stator core and magnetic pole sections and exciting windings of at least two phases, and a rotor that rotates with respect to the stator. The stator core has N slots and N magnetic pole sections (N is a natural number of two or more) arranged to be spaced at equal intervals in a peripheral direction thereof. The exciting windings of at least two phases are wound on the N magnetic pole sections. The rotor includes a rotor core and P permanent magnet magnetic pole sections (P is an even number). The P permanent magnet magnetic pole sections are formed within the rotor core to be spaced at equal intervals. Each of the P permanent magnet magnetic pole sections is constituted from a permanent magnet embedded within the rotor core. Then, a ratio of P to N or P/N is set to be larger than $43/45$. In the present invention, a pole arc ratio $\Psi_p$ of each permanent magnet magnetic pole section of the motor is determined by calculation using the following expression:

$$\Psi_p = 2mP/N + P/4LCM(P, N) - 2n + kP/LCM(P, N)$$

wherein LCM(P, N) is the least common multiple between the P and the N, m and n are arbitrary natural numbers, k is an arbitrary integer, and the $\Psi_p$ is a value larger than zero but smaller than one.

When the ratio P/N is set within the range of $2/3 \leq P/N \leq 43/45$ and $P_o$ of an irreducible fraction $P_o/N_o$ of the P/N is set to an even number, the pole arc ratio $\Psi_p$ is determined to satisfy the following expression:

$$\Psi_p = 2mP/N + P/4LCM(P, N) - 2n + P/LCM(P, N).$$

When the ratio P/N is set within the range of $2/3 \leq P/N \leq 43/45$ and the $P_o$ of the irreducible fraction $P_o/N_o$ of the P/N is set to an odd number, the pole arc ratio $\Psi_p$ is determined to satisfy the following expression:

$$\Psi_p = 2mP/N + P/4LCM(P, N) - 2n.$$

The permanent magnet magnetic pole section is herein defined to be the pole section formed in a certain region due to the presence of the permanent magnet. Two or more spaced permanent magnets of the same polarity are sometimes combined to constitute one magnetic pole section. When one permanent magnet magnetic pole section is formed by combination of two permanent magnets that are spaced apart to each other at a predetermined interval, the number of the permanent magnet magnetic pole sections P becomes a half of the number of the permanent magnets. Between two embedded adjacent permanent magnets, a magnetic pole section, of which the polarity is different from that of the two adjacent permanent magnets, can be formed by means of magnetic flux of the two adjacent magnets without embedding a permanent magnet therebetween. The magnetic pole section thus formed without embedding a permanent magnet also composes the permanent magnet magnetic pole section. In this case, though the number of the permanent magnets actually embedded is P, the number of the resulting permanent magnetic pole sections becomes 2P (double of P). In this case, preferably, the dimensions of each permanent magnet and the dimensions of the section that exhibits the different polarity are set to be the same.

When an angle between two line segments, each of which connects the center of the rotor and one of both corners in the peripheral direction of a permanent magnet magnetic pole section, is indicated by $\theta pp$, and an angle ($2\pi/P$) obtained by dividing a full circumference angle (360°) of the rotor core by the number of the permanent magnet magnetic pole sections is indicated by $\theta p$, the pole arc ratio $\Psi_p$ is defined to be a ratio of $\theta pp/\theta p$, as shown in FIG. 4. The angle θpp is referred to as a permanent magnet angle, while the angle θp is referred to as the number of poles.

When a permanent magnet magnetic pole section includes a pair of nonmagnetic flux barriers at both ends in the peripheral direction thereof, the sectional profile of each flux barrier, as seen from one side in the axis direction of the rotor core has a plurality of corners. Then, an angle between two line segments assumed for the pair of flux barriers, each of which connects the center of the rotor core and one of the corners that is closest to the surface of the rotor core is indicated by θpp, as shown in FIG. 1(B).

When a pair of grooves extending in the axis direction of the rotor core and opening in the surface of the rotor core are formed close to both ends in the peripheral direction of a permanent magnet magnetic pole section, the grooves have a sectional profile, as seen from one side in the axis direction of the rotor core, has a plurality of corners. Then, an angle between two line segments each of which connects the center of the rotor core and one of the plurality of corners that is located in the surface of the rotor core and adjacent to a corresponding one of the permanent magnet magnetic pole sections is indicated by θpp, as shown in FIG. 3.

Generally, the number of cogging torque waves per revolution of the rotor is represented by the least common multiple LCM(P, N) between the number of the permanent magnet magnetic pole sections P and the number of the slots N. This is because a change in the magnetic energy in the permanent magnets is generated LCM (P, N) times. Then, the inventors of the present invention have found that when the number of cogging torque waves can be made twice as large as the LCM (P, N), cogging torque can be reduced. Normally, the polarity changing point of the magnetic energy is present for each ½ of $2\pi/LCM(P, N)$. Then, the polarity changing point should be present more frequently for each ¼ of $2\pi/LCM(P, N)$. More specifically, the absolute value of a difference between an even multiple of a pitch angle ($2\pi/N$) of the slots and the angle θpp that minimizes the cogging torque should be made to be equal to the absolute value of a difference between an even multiple of a pitch angle ($2\pi/P$) of the permanent magnets and one quarter of the $2\pi/LCM$ (P,N). This is formulated as follows:

$$|2m \times 2\pi/N - \theta pp| = |2n \times 2\pi/P - 2\pi/[4 \times LCM(P, N)]|$$

When the pole arc ratio $\Psi_p$ is determined using the above equation, it is determined as follows:

$$\Psi_{pp}/(2\pi/P) = \{2m \times 2\pi/N + 2\pi/[4 \times LCM(P, N)] - 2n \times 2\pi/P\}/(2\pi/P) = 2mP/N + P/4LCM(P, N) - 2n$$

The minimum value of the waveform of the cogging torque appears for each $2\pi/2 \cdot LCM(P, N)/(\pi/P)$. More specifically, since the minimum value appears for each $P/LCM(P,N)$, the pole ratio $\Psi_p$ can be determined as follows:

$$\Psi_p = 2mP/N + P/4CLM(P, N) - 2n + kP/LCM(P, N)$$

wherein the LCM(P, N) is the least common multiple between the P and the N, m and n are arbitrary natural numbers, k is an arbitrary integer, and the $\Psi_p$ is larger than zero but smaller than one.

In the above equation, an infinite number of m, n, k can be selected. However, the value of the magnet pole arc ratio is larger than zero but smaller than one. Thus, if the number of the poles and the number of the slots are restricted, the preferable values of the pole arc ratio are narrowed down to certain values. The more specific the pole ratio value $\Psi_p$ should be set to be in the range of the value, determined by the expression of the pole arc ratio $\Psi_p$ described above and then obtained by rounding off the value to three decimal places (or counting fractions of ½ and over as a unit and disregarding the rest), ±2.2%. With this arrangement, in the case of the motor with the motor capacity of 15 kW, the cogging torque can be reduced to approximately 3N·m or less. For this reason, the interior permanent magnet rotary motor that can reduce the cogging torque can be obtained.

In the present invention in particular, the value of the P/N is specified. The pole arc ratio $\Psi_p$ of the motor of the present invention is thereby smaller than that of the motor with the same number of the poles and the same number of the slots, disclosed in Japanese Patent Application Laid-Open Publication No. 299199/1999. Thus, the dimension of each permanent magnet in the direction orthogonal to the diameter direction of the rotor core can be reduced. For this reason, the amount of the permanent magnet used can be reduced. Further, formation of a flux barrier or the like for promoting flow of magnetic fluxes to the stator between adjacent two permanent magnets is facilitated. Incidentally, in the present invention, though the dimension of each permanent magnet in the direction orthogonal to the diameter direction of the rotor core can be reduced, torque will not be greatly reduced. The following is the reason for this.

When total torque generated by the motor is indicated by T, magnet torque generated based on the magnetic energy of the permanent magnets is indicated by Tm, reluctance torque generated based on magnetic energy inclination due to an inductance difference is indicated by Tr, and a current lead angle is indicated by β, the total torque T is expressed by the following equation:

$$T = Tm + Tr = (P/2)\{\Psi_a \cdot Ia \cdot \cos\beta + 0.5 \cdot (Lq - Ld) \cdot Ia^2 \cdot \sin 2\beta\} [N \cdot m]$$

in which P indicates the number of the poles, $\Psi_a$ indicates the number of interlinked magnetic fluxes [Wb] caused by the permanent magnets, Ia indicates an armature current [A], Lq indicates an inductance [H] for a q axis, which is the axis that passes through the center of the rotor core and also passes between two adjacent permanent magnet magnetic pole sections, Ld indicates an inductance [H] for a d axis which is the axis that passes through the center of the rotor core and the center of each permanent magnet magnetic pole section, and Ld is equal to or less than Lq.

From the above equation, it can be seen that the magnet torque Tm becomes the maximum when the current lead angle β is 0°, the reluctance torque Tr becomes the maximum when the current lead angle β is 45°, and the total torque T becomes the maximum when the current lead angle β is in the range of 0° to 45°. The inductance is a proportionality constant indicating the amount of armature magnetic flux produced relative to an armature magnetomotive force caused by flow of a current in armature windings. Thus, when the inductance Ld is equal to or less than the inductance Lq, it indicates that the armature magnetic flux is difficult to flow through the d axis, though the armature magnetic flux is easy to flow through the q axis. An approximately 5000 times difference of permeability is present between the permanent magnets having substantially the same permeability as air and magnetic steel plates arranged between the adjacent permanent magnets, so that the armature magnetic flux is difficult to flow through the d axis. More specifically, it can be seen that the inductance Ld is smaller than the inductance Lq. In the motor of the present invention, the magnet torque Tm decreases by reduction of the pole arc ratio $\Psi_p$. The reluctance torque Tr, however, increases. Accordingly, at the current lead angle β at which the maximum torque can be obtained, the torque T, which is substantially the same as the prior art, can be obtained.

The reason why the pole arc ratio $\Psi_p$ of the motor according to the present invention is not included in the range of the pole arc ratio $\Psi_p$ in the prior art, which is disclosed in Japanese Patent Application Laid-Open Publication No. 299199/1999, will be described below. A permanent magnet angle θ and the pole arc ratio $\Psi_p$ satisfy the relation of $\Psi_p=\theta/(360/P)$. If $\theta \approx n \times \tau s+16/P$ and $\tau s=360/N$ in the prior art are substituted into this equation, $\Psi_p=P/360 \times n \times 360/N+P/360 \times 16/P=nxP/N+16/360$ (Equation (1)) holds. Since the pole arc ratio $\Psi_p$ is larger than zero but smaller than one, $n \times P/N \leq 1-16/360=43/45$ holds. Further, since n is a natural number, $P/N \leq 43/45$ holds. On contrast therewith, in the methods of the inventions according to claims 1, 2, and 3, P/N is larger than $43/45$. Thus, the pole arc ratio $\Psi_p$ determined by the methods according to claims 1, 2, and 3 is not included in the range of the pole arc ratio $\Psi_p$ according to the prior art.

In the methods of the present invention according to claims 5, 6, and 7, the ratio P/N is set to be equal to or smaller than $43/45$. In the structure with eight poles and 12 slots, for example, in which the $P_o$ of the irreducible fraction $P_o/N_o$ of the P/N becomes the even number 2, the pole arc ratio $\Psi_p$ of $32/45$ is obtained using the above equation (1). On contrast therewith, if the pole arc ratio $\Psi_p$ is determined using the expression of the present invention of $\Psi_p=2$ mP/N+P/4LCM (P, N)−2n+P/LCM (P, N), the pole arc ratio $\Psi_p$ of $5/12$ is obtained. Accordingly, the pole arc ratios $\Psi_p$ of the motor determined by the methods of the inventions according to claims 5, 6, and 7 are not included in the range of the pole arc ratio $\Psi_p$ in the prior art.

In the methods of the inventions according to 9, 10, and 11 as well, the ratio P/N is set to be equal to or smaller than $43/45$. In the structure with ten poles and 12 slots, for example, in which the $P_o$ of the irreducible fraction $P_o/N_o$ of the P/N becomes the odd number five, the pole arc ratio $\Psi_p$ of $79/90$ is obtained using the above equation (1). On contrast therewith, if the pole arc ratio $\Psi_p$ is determined using the expression of the present invention of $\Psi_p=2$ mP/N+P/4LCM (P, N)−2n+P/LCM (P, N), the pole arc ratios $\Psi_p$ of $1/24$, 0.375, and $17/24$ are obtained. Accordingly, the pole arc ratios $\Psi_p$ determined by the methods of the inventions according to claims 9, 10, and 11 are not included in the range of the pole arc ratio $\Psi_p$ in the prior art.

If the pole arc ratio $\Psi_p$ of the motor is determined as in the present invention, the interior permanent magnet rotary motor, which can reduce the cogging torque and can also reduce the amount of the permanent magnets used without reducing the torque, can be obtained.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF PREFFERED EMBODIMENTS

Figure 1A:
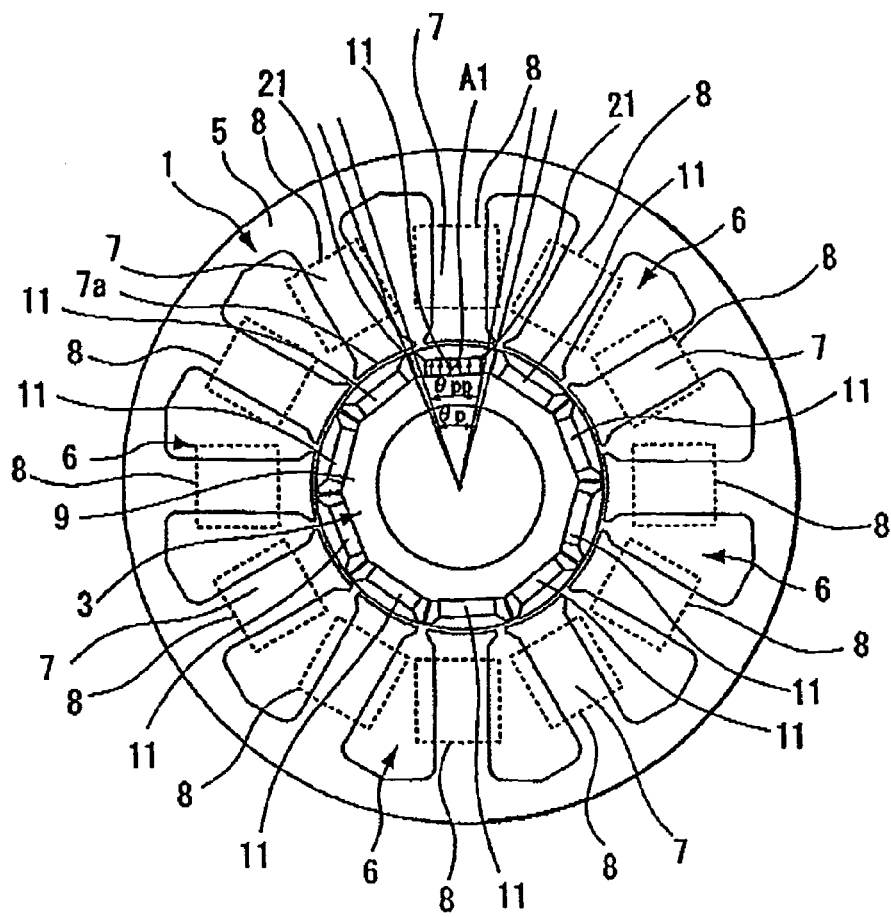
FIG. 1(A) is a plan view of a stator and a rotor of an interior permanent magnet rotary motor used for explaining a first embodiment of the present invention.
Figure 1B:
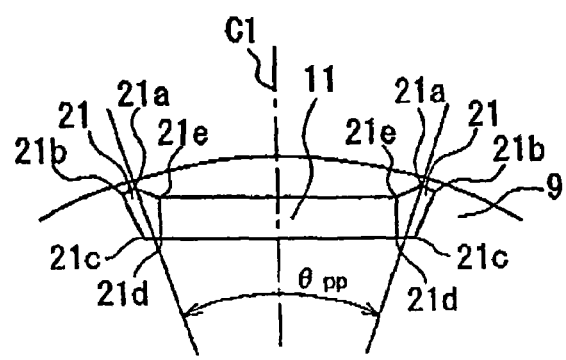
FIG. 1(B) is a partial enlarged view of FIG. 1(A)

The best mode for carrying out the present invention will be described with reference to the appended drawings. FIG. 1(A) is a schematic diagram showing a stator 1 and a rotor 3 of an interior permanent magnetic rotary motor used for explaining a first embodiment of the present invention. FIG. 1(B) is a partial enlarged view of FIG. 1(A). As shown in both of the drawings, the stator 1 includes a cylindrical yoke 5 and 12 magnetic pole sections 7 that protrude toward the center of the stator from the inner periphery of the yoke 5. Each of the 12 magnetic pole sections 7 has a magnetic pole surface 7a at a leading end thereof. With this arrangement, the stator 1 has N slots 6 (being 12, herein) arranged between respective adjacent pairs of the magnetic pole sections 7 which are spaced at equal intervals in a peripheral direction thereof. On each of the magnetic pole sections 7, a winding section 8 constituted from an exciting winding of two phases wound in a concentrated manner is formed. For facilitating understanding, the winding 8 is indicated by a broken line in FIG. 1. In other embodiments, which will be described later, illustration of the windings is omitted.

The rotor 3 includes a cylindrical rotor core 9 and P (being ten, herein) sheet-like permanent magnets 11 each constituting a permanent magnet magnetic pole section. The P permanent magnets 11 are embedded within the rotor core 9 at the equal interval in the peripheral direction of the rotor core, being close to the surface portion of the rotor core 9. In this embodiment, one permanent magnet constitutes one permanent magnet magnetic pole section. The P permanent magnets 11 are magnetized so that N poles and S poles alternate on the side of the surface of the rotor core 9. Each of the stator 1 and the rotor core 9 is constructed by laminating a plurality of steel plates on each other. As described above, the interior permanent magnetic rotary motor in this embodiment has a structure having ten poles with 12 slots. With this arrangement, P/N ($10/12$) is set to be in the range of $2/3$ to $43/45$, and $P_0$ of $P_0/N_0$ ($5/6$), which is the irreducible fraction of the P/N, is set to the odd number five. Each of the permanent magnets 11 has a rectangular section. The magnetizing direction of a permanent magnet 11 (as shown in an arrow A1) is parallel to the thickness direction of the permanent magnet 11.

A pair of flux barriers 21 each formed of a cavity is formed at both ends in the peripheral direction of the permanent magnet 11. Each of the flux barriers 21 is made of a nonmagnetic material such as air and promotes flow of magnetic fluxes to the stator. As shown in detail in FIG.

1(B), the sectional profile of each flux barrier 21, as seen from one side in the axis direction of the rotor core 9, is a pentagon having five corners 21a to 21e. Assume that a line segment which connects the center of the rotor core 9 and one corner 21a that is closest to the surface of the rotor core 9 among the five corners 21a to 21e. Then, the angle between two of the line segments for the pair of flux barriers 21 is indicated by θpp and an angle 2π/P obtained by dividing a full circumference angle (360°) by the number of the permanent magnets (the number of poles) is indicated by θp. Then, a pole arc ratio $\psi_p$ of the permanent magnet 11 of the interior permanent magnet rotary motor in this embodiment is defined to be the value of the ratio of θpp/θp. This pole arc ratio $\Psi_p$, in which $\Psi_p$ is larger than zero but smaller than one, satisfies the relation of $\Psi_p = 2mP/N + P/4LCM(P, N) - 2n$, in which LCM (P, N) is the least common multiple between P and N, and m and n are arbitrary natural numbers.

In the above expression, an infinite number of the values of m and n can be selected. However, the value of the magnet pole arc ratio is larger than zero but smaller than one. Thus, in the case of the structure having the ten poles and the 12 slots, the preferable values of the pole arc ratio are narrowed down to the following three values:

(1) The value of the $\Psi_p$ being 1/24, which is 0.041, when (m, n) are (6, 5).

(2) The value of the $\Psi_p$ being 3/8, which is 0.375, when (m, n) are (5, 4).

(3) The value of the $\Psi_p$ being 17/24, which is 0.708, when (m, n) are (4, 3).

Figure 2:
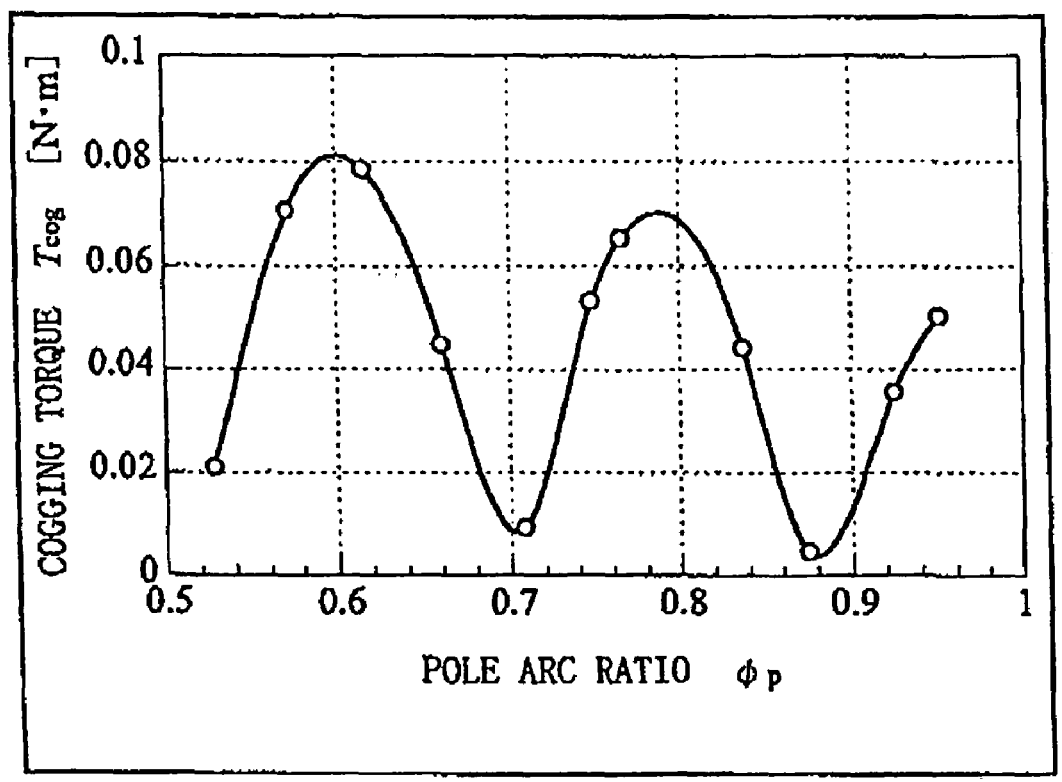
FIG. 2 is a graph in which a relationship between a pole arc ratio $\Psi_p$ and cogging torque of the interior permanent magnet rotary motor shown in FIG. 1 is determined by electromagnetic field simulation.

FIG. 2 is a graph in which the relationship between the pole arc ratio $\Psi_p$ and cogging torque of the interior permanent magnet rotary motor having ten poles and 12 slots is obtained by electromagnetic field simulation. It can be found from FIG. 2 that if the pole arc ratio $\Psi_p$ is set to 0.708±2.2% or 0.692 to 0.724, which is in the range of the value, determined by the expression of the pole arc ratio $\Psi_p$ described above and then obtained by rounding off the value to three decimal places (or counting fractions of ½ and over as a unit and disregarding the rest), ±2.2%, the cogging torque becomes approximately 0.02N·m or less.

Figure 3:
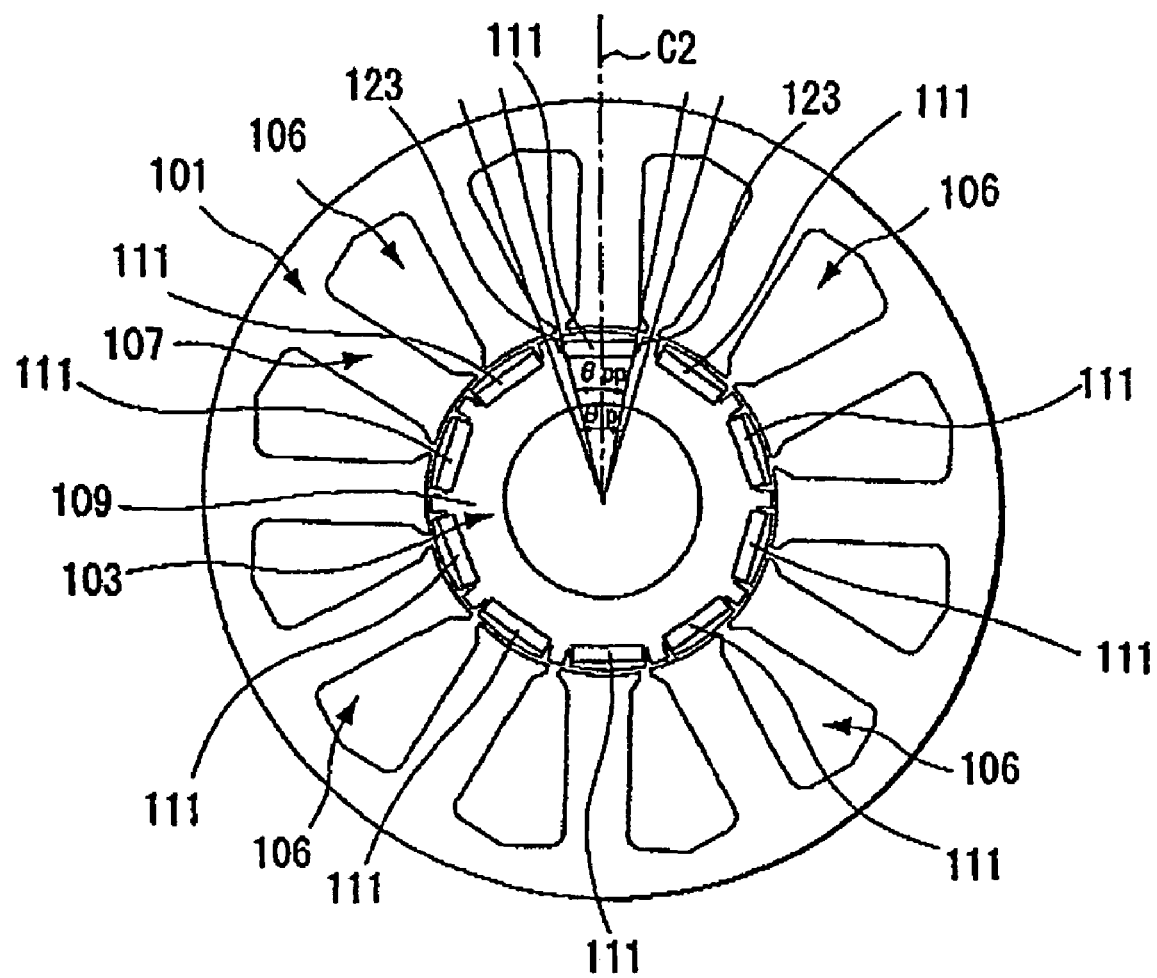
FIG. 3 is a plan view of a stator and a rotor of an interior permanent magnet rotary motor used for explaining a second embodiment of the present invention.
Figure 4:
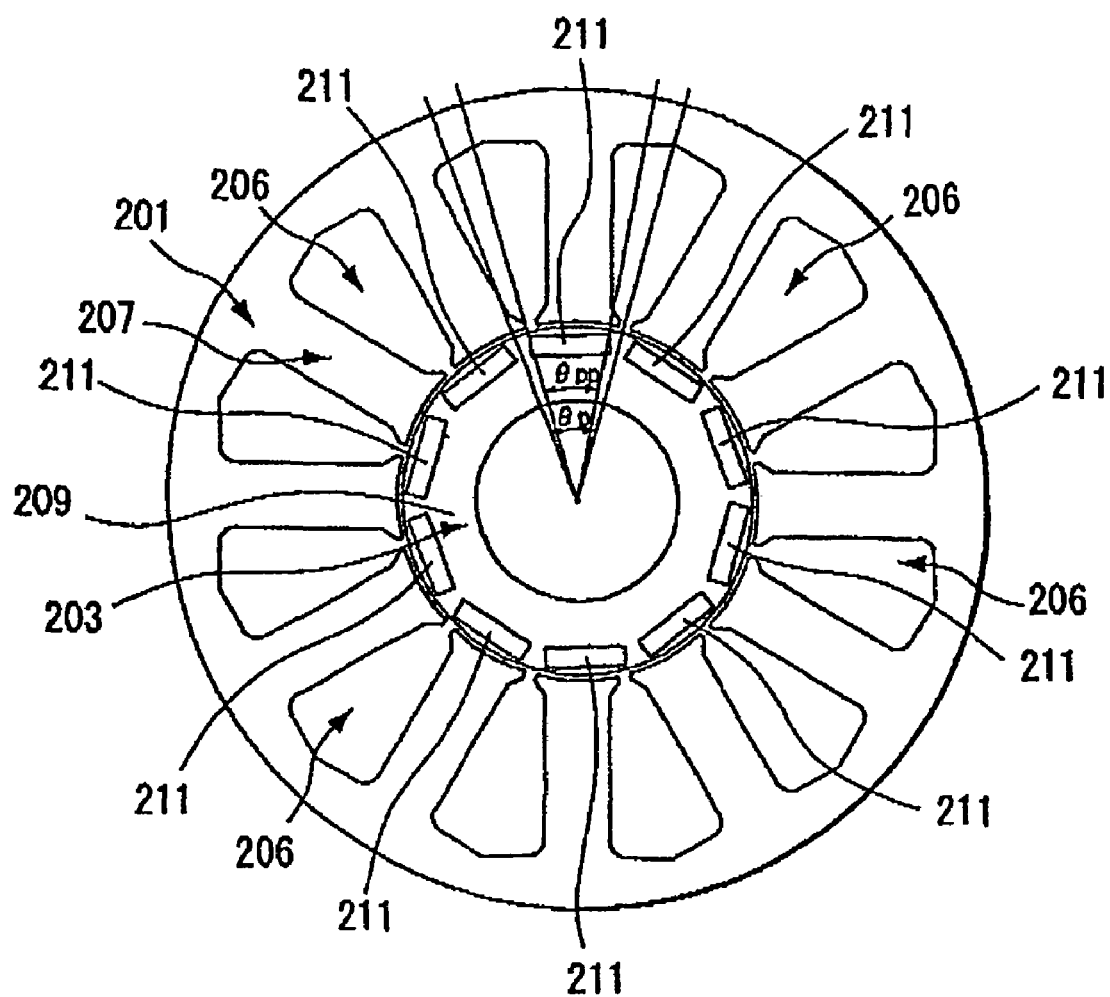
FIG. 4 is a plan view of a stator and a rotor of an interior permanent magnet rotary motor used for explaining a third embodiment of the present invention.

This embodiment shows an example where the flux barriers are employed in the motor with the permanent magnets embedded within the rotor core thereof. In a second embodiment, a pair of grooves 123 that extend in the axis direction of a rotor core 109 is formed in the surface of the rotor core 109 close to both ends in the peripheral direction of a permanent magnet 111, as shown in FIG. 3. When the section of a groove 123 is seen from one side of the axis direction of the rotor core 109, the sectional profile of the groove 123 has a plurality of corners. Assume a line segment which connects the center of the rotor core 109 and one of the corners that is located in the surface of the rotor core 109 and adjacent to the corresponding permanent magnet magnetic section. Then, the angle between two of the line segments for the pair of grooves 123 is indicated by θpp. The pole arc ratio $\psi_p$ defined to be the ratio of θpp/θp is then determined. In a third embodiment, the motor does not include the flux barriers or the grooves, as shown in FIG. 4. Then, the angle between two line segments each of which connects the center of a rotor 203 and the corner of the magnetic pole section in the peripheral direction of a permanent magnet 211, located on the side of the surface of the rotor core 209 is indicated by θpp, and the pole arc ratio $\Psi_p$ defined to be the ratio of θpp/θp is determined.

Figure 5:
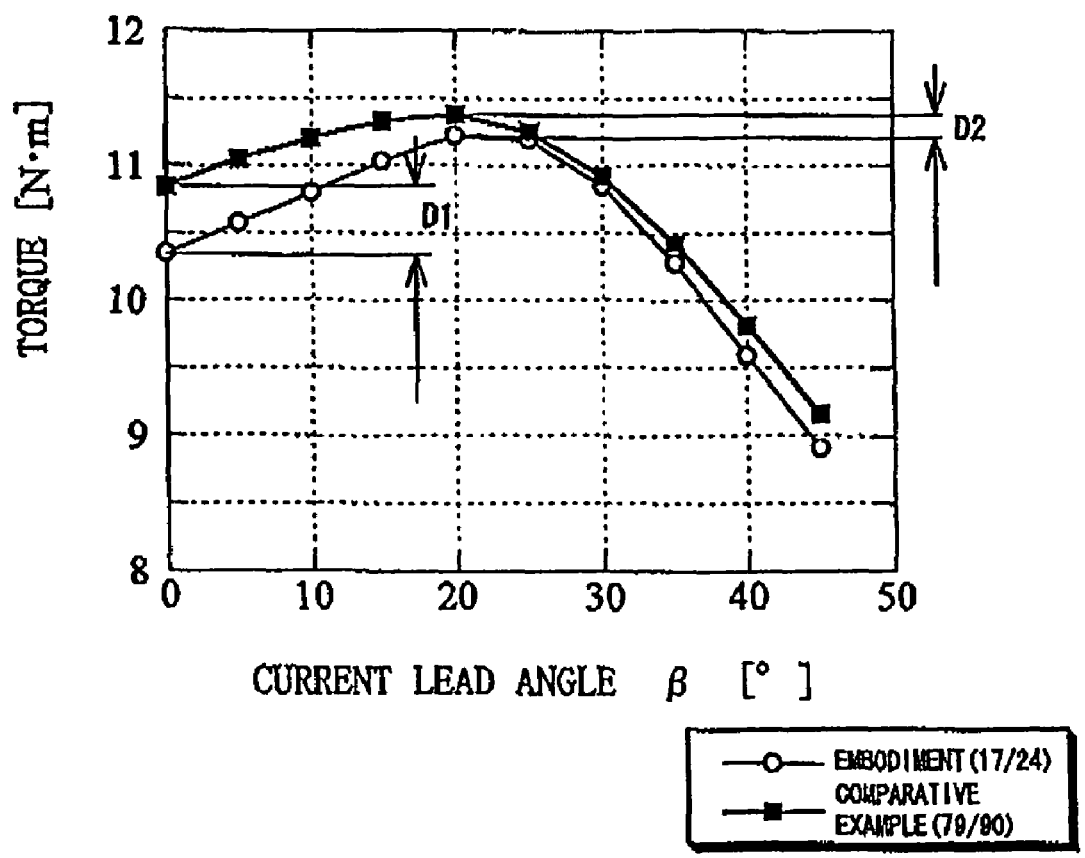
FIG. 5 shows relationships between current lead angles and torques of motors used for a test.

FIG. 5 shows the relationships between current lead angles β and torques of the motor in the second embodiment and the motor of a comparative example. Both of the motors have the structure having ten slots and 12 slots, in which a pair of grooves is formed in the surface of the rotor core 109. The motor in the second embodiment has the pole arc ratio $\Psi_p$ of 17/24 (0.708), while the motor of the comparative example has the pole arc ratio $\Psi_p$ of 79/90 (0.877). It can be seen from FIG. 5 that when the current lead angle β is 0°, a torque difference D1 of the motor in the second embodiment from the motor of the comparative example is −5%. It can also be seen that when the current lead angle is 18° to 22°, at which the maximum torque is obtained, a torque difference D2 of the motor in the second embodiment from the motor of the comparative example becomes −1.4%, so that the torques of both of the motors become almost equal. The pole arc ratio $\Psi_p$ of the motor in the second embodiment is set to be smaller than that of the motor of the comparative example. It can be thereby seen from the above-mentioned results that, in the second embodiment, the dimensions of the permanent magnets in the direction orthogonal to the diameter direction of the rotor core are reduced, and though the magnet torque of the motor is reduced, the reluctance torque of the motor can be increased. Accordingly, it can be seen that the arrangement of this embodiment does not lead to reduction of the maximum torque. In this embodiment, the amount of the permanent magnets used can be reduced by 5.7 volume percent.

Figure 6:
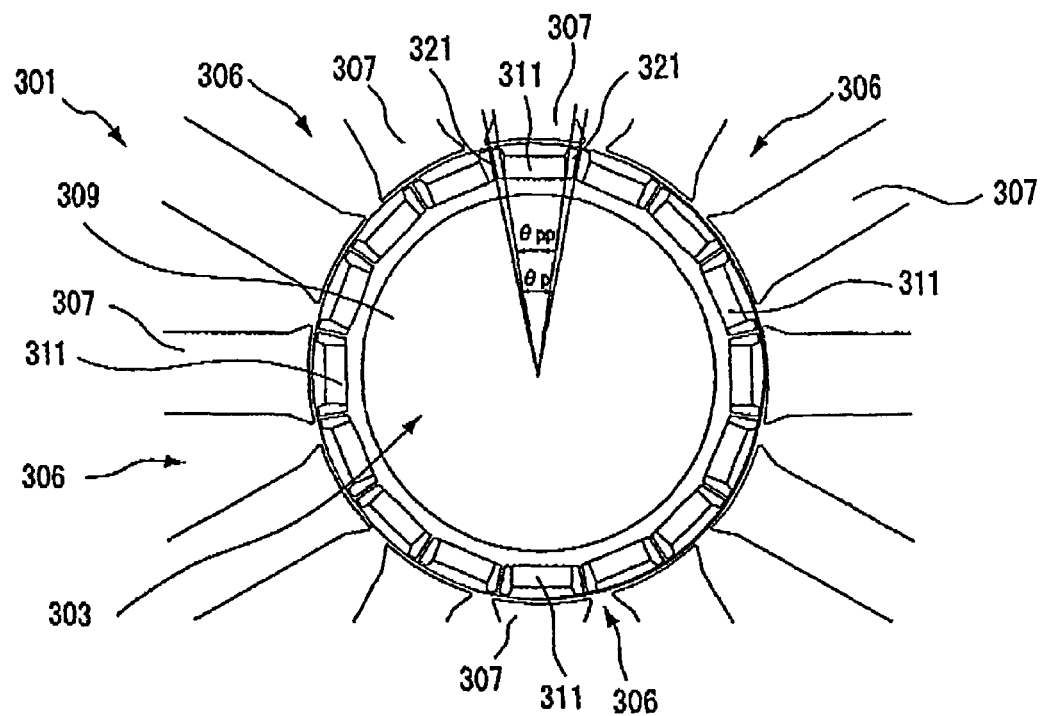
FIG. 6 is a plan view of a stator and a rotor of an interior permanent magnet rotary motor used for explaining a fourth embodiment of the present invention.

FIG. 6 shows a plan view of a stator 301 and a rotor 303 of an interior permanent magnet rotary motor used for explaining a fourth embodiment of the present invention. As shown in FIG. 6, the stator 301 has 12 magnetic pole sections 307. With this arrangement, the stator 301 has N (being 12 herein) slots 306 arranged between respective adjacent pairs of the magnetic pole sections 307 and spaced at equal intervals in the peripheral direction of the stator 301.

The rotor 303 has P (being 16 herein) sheet-like permanent magnets 311 close to the surface portion of a rotor core 309, which are embedded at equal intervals in the peripheral direction of the rotor 303. The P permanent magnets 311 are magnetized so that the N poles alternate with the S poles on the side of the surface of the rotor core 309. As described above, the interior permanent magnetic rotary motor in this embodiment has a structure having the 16 poles and the 12 slots. With this arrangement, the P/N (16/12) is set to be larger than 43/45. Then, a pair of flux barriers 321 each formed of a cavity is formed at both ends in the peripheral direction of a permanent magnet 311.

Figure 7:
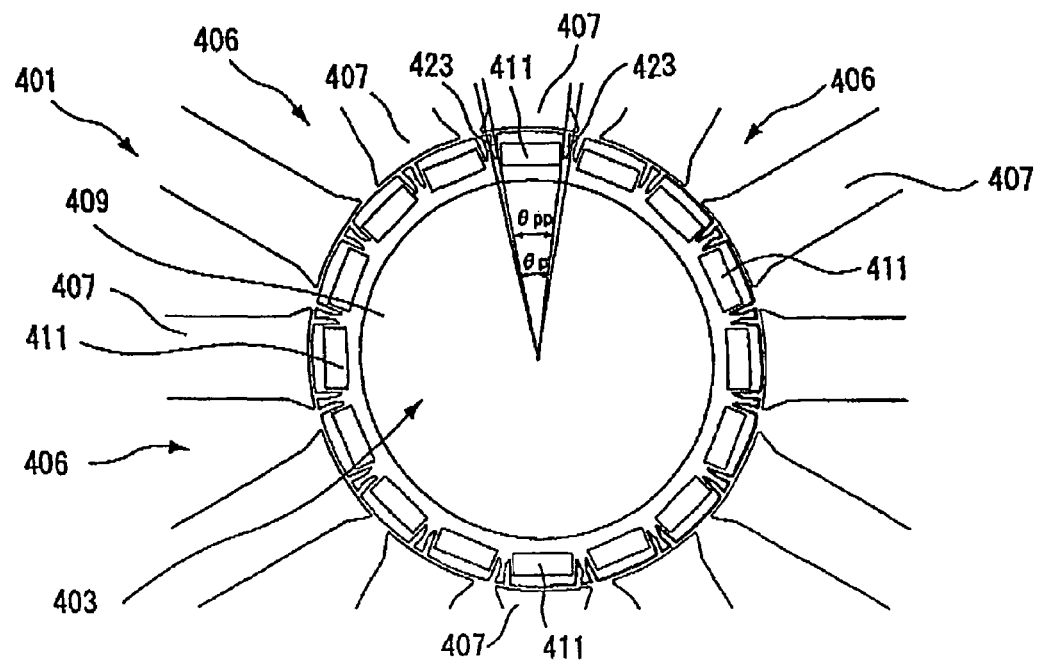
FIG. 7 is a plan view of a stator and a rotor of an interior permanent magnet rotary motor used for explaining a fifth embodiment of the present invention.

FIG. 7 is a plan view of a stator 401 and a rotor 403 of an interior permanent magnet rotary motor used for explaining a fifth embodiment of the present invention. In this embodiment, a pair of grooves 423 is provided in place of a pair of flux barriers 321. In other respects, the motor in this embodiment has the same structure as the interior permanent magnet rotary motor in the fourth embodiment shown in FIG. 6.

The pole arc ratio $\Psi_p$ of the permanent magnets in the interior permanent magnet rotary motor in the fourth and fifth embodiments, in which $\Psi_p$ is larger than zero but smaller than one, satisfies the relation of $\Psi_p = 2mP/N + P/4LCM(P, N) - 2n + kP/LCM(P, N)$, in which the LCM(P, N) is the least common multiple between P and N, m and n are arbitrary natural numbers, and k is an arbitrary integer.

In the above expression, an infinite number of the values of m and n can be selected. However, the value of the pole arc ratio is larger than zero but smaller than one. Thus, in the case of the structure having the 16 poles and the 12 slots, the preferable values of the magnet pole arc ratio are narrowed down to the following three values:

(1) The value of the $\Psi_p$ being ¾, which is 0.75, when (m, n, k) are (1, 1, 0).
(2) The value of the $\Psi_p$ being 5/12, which is 0.416, when (m, n, k) are (3, 4, 1).
(3) The value of the $\Psi_p$ being 1/12, which is 0.083, when (m, n, k) are (3, 4, 0).

Also, it is a matter of course to form permanent magnet magnetic pole sections only by using permanent magnets without providing flux barriers as shown in FIG. 6.

Figure 8:
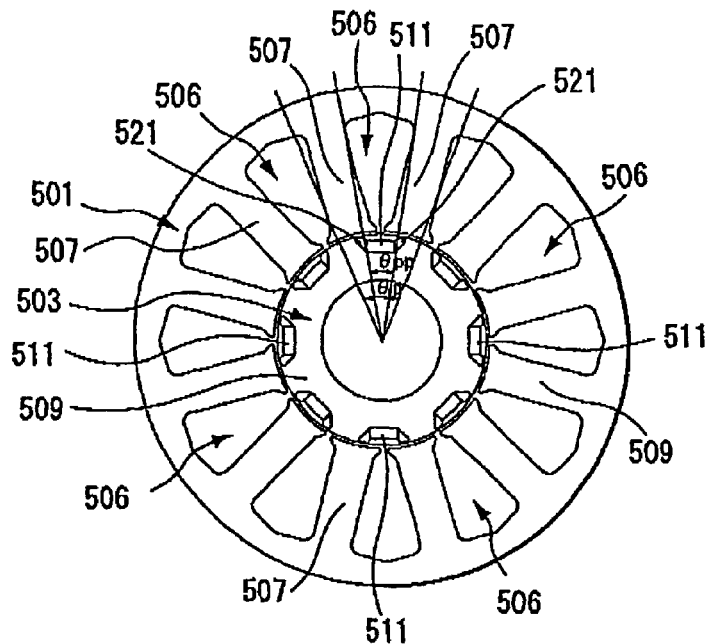
FIG. 8 is a plan view of a stator and a rotor of an interior permanent magnet rotary motor used for explaining a sixth embodiment of the present invention.

FIG. 8 is a plan view of a stator 501 and a rotor 503 of an interior permanent magnet rotary motor used for explaining a sixth embodiment of the present invention. As shown in FIG. 8, the stator 501 includes 12 magnetic pole sections 507. With this arrangement, the stator 501 has N (being 12, herein) slots 506 arranged between respective adjacent pairs of the magnetic pole sections 507 to be spaced at equal intervals in the peripheral direction of the stator 501.

The rotor 503 has P (being eight, herein) sheet-like permanent magnets 511 which are embedded at equal intervals in the peripheral direction of the rotor 503, being close to the surface portion of the rotor core 509. The P permanent magnets 511 are magnetized so that the N poles and the S poles alternate on the side of the surface of the rotor core 509. As described above, the interior permanent magnet rotary motor in this embodiment has a structure having the eight poles with the 12 slots. With this arrangement, the P/N (8/12) is set to be in the range of ⅔ to 43/45. The $P_0$ of $P_0/N_0$ (⅔) which is the irreducible fraction of the P/N is set to the even number two. Then, a pair of flux barriers 521 each formed of a cavity is formed at both ends in the peripheral direction of each permanent magnet 511.

Figure 9:
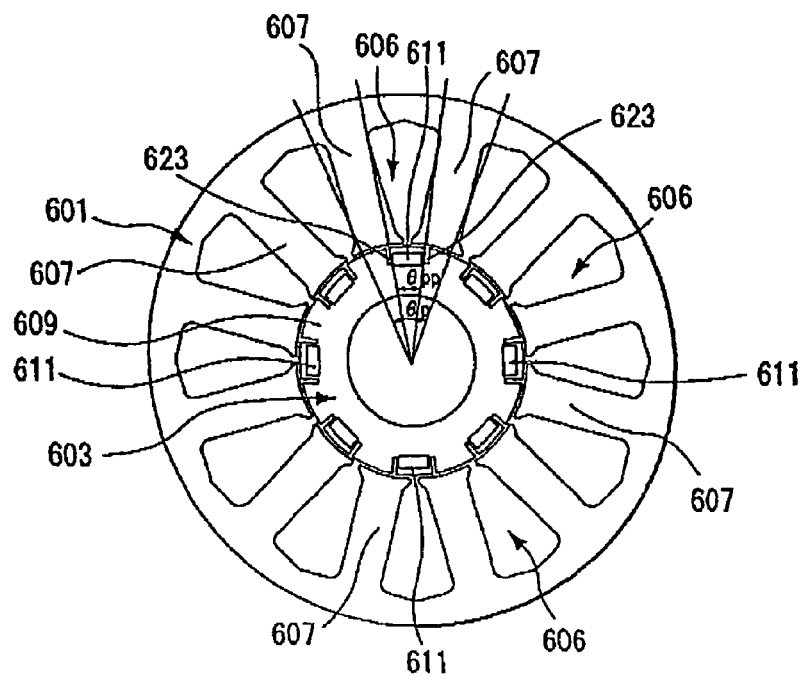
FIG. 9 is a plan view of a stator and a rotor of an interior permanent magnet rotary motor used for explaining a seventh embodiment of the present invention.

FIG. 9 shows a plan view of a stator 601 and a rotor 603 of an interior permanent magnet rotary motor used for explaining a seventh embodiment of the present invention. In this embodiment, a pair of grooves 623 is provided in place of the pair of flux barriers 521. In other respects, the motor in this embodiment has the same structure as the interior permanent magnet rotary motor in the sixth embodiment shown in FIG. 8.

The pole arc ratio $\Psi_p$ of the permanent magnets in the interior permanent magnet rotary motor in the sixth and seventh embodiments, in which $\Psi_p$ is larger than zero but smaller than one, satisfies the relation of $\Psi_p = 2mP/N + P/4LCM(P, N) - 2n + P/LCM(P, N)$, where the LCM(P, N) is the least common multiple between P and N, m and n are arbitrary natural numbers.

In the above equation, an infinite number of the values of m and n can be selected. However, the value of the magnet pole arc ratio is larger than zero but smaller than one. Thus, in the case of the structure having the eight poles and the 12 slots, the value of the pole arc ratio $\Psi_p$ is narrowed down to the following value:

The value of $\Psi_p$ being 5/12, which is 0.416, when (m, n) are (3, 2).

Also, it is a matter of course to form permanent magnet magnetic pole sections only by using permanent magnets without providing flux barriers as shown in FIG. 8.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method of determining a pole arc ratio of an interior permanent magnet rotary motor, said interior permanent magnet rotary motor comprising:

a stator including a stator core having N slots and N magnetic pole sections (N: a natural number of 2 or more) arranged to be spaced at equal intervals in a peripheral direction thereof and exciting windings of at least two phases wound on said N magnetic pole sections; and a rotor having a rotor core and P permanent magnet magnetic pole sections (P: an even number), said rotor rotating with respect to said stator;

said P permanent magnet magnetic pole sections being formed within said rotor core to be spaced at equal intervals in a peripheral direction of said rotor core;

each of said P permanent magnet magnetic pole sections being constituted from a permanent magnet embedded within said rotor core; and a ratio of the P to the N being set to be larger than 43/45;

wherein said pole arc ratio of said permanent magnet magnetic pole section indicated by $\Psi_p$ is determined by calculation using the following expression:

$$\Psi_p = 2mP/N + P/4LCM(P, N) - 2n + kP/LGM(P, N)$$

wherein LCM(P, N) is a least common multiple between the P and the N, m and n are arbitrary natural numbers, k is an arbitrary integer, and the $\Psi_p$ is a value larger than zero but smaller than one.

2. The method of determining a pole arc ratio of an interior permanent magnet rotary motor as defined in claim 1, wherein said each of said P permanent magnet magnetic pole sections has a pair of nonmagnetic flux barriers at both ends in a peripheral direction thereof;

flux barriers have a sectional profile having a plurality of corners as seen from one side in an axis direction of said rotor core;

said pole arc ratio of said permanent magnet magnetic pole section is defined to be a ratio of θpp/θp where an angle between two line segments, each of which connects a center of said rotor core and one of said plurality of corners that is closest to a surface of said rotor, is indicated by the θpp and an angle obtained by dividing a full circumference angle (360°) of said rotor core by a number of said permanent magnet pole sections is indicated by the θp, and said pole arc ratio of said permanent magnet magnetic pole section indicated by $\Psi_p$ is determined by calculation using said expression.

3. The method of determining a pole arc ratio of an interior permanent magnet rotary motor as defined in claim 1, said interior permanent magnet rotary motor further comprising:

a pair of grooves being formed close to both ends in a peripheral direction of said each of said P magnet magnetic pole sections, said pair of grooves extending in an axis direction of said rotor core and being opened in a surface of said rotor core;

wherein said grooves have a sectional profile having a plurality of corners as seen from one side in an axis direction of said rotor core, said pole arc ratio of said permanent magnet magnetic pole section is defined to be a ratio of θpp/θp where an angle between two line segments, each of which connects a center of said rotor core and one of said plurality of corners that is located in said surface of said rotor core and adjacent to a corresponding one of said permanent magnet magnetic pole sections, is indicated by the θpp and an angle obtained by dividing a full circumference angle (360°) of said rotor core by a number of said permanent magnet pole sections is indicated by the θp, and said pole arc ratio of said permanent magnet magnetic pole section indicated by $\Psi_p$ is determined by calculation using said expression.

4. The method of determining a pole arc ratio of an interior permanent magnet rotary motor as defined in claim 1, wherein said pole arc ratio of said permanent magnet magnetic pole section $\Psi_p$ is a value in a range of a figure, obtained by rounding off the figure to three decimal places, ±2.2%, said value being obtained from said expression for determining the $\Psi_p$.

5. A method of determining a pole arc ratio of an interior permanent magnet rotary motor, said interior permanent magnet rotary motor comprising:
   a stator including a stator core having N slots and N magnetic pole sections (N: a natural number of 2 or more) arranged to be spaced at equal intervals in a peripheral direction thereof and exciting windings of at least two phases wound on said N magnetic pole sections; and
   a rotor having a rotor core and P permanent magnet magnetic pole sections (P: even number), said rotor rotating with respect to said stator;
   said P permanent magnet magnetic pole sections being formed within said rotor core to be spaced at equal intervals in a peripheral direction of said rotor core;
   each of said P permanent magnet magnetic pole sections being constituted from a permanent magnet embedded within said rotor core; and
   a ratio of the P to the N being set within the range of $2/3 \leq P/N \leq 43/45$ and $P_o$ of an irreducible fraction $P_o/N_o$ of the P/N being set to an even number;
   wherein said pole arc ratio of said permanent magnet magnetic pole section indicated by $\Psi_p$ is determined by calculation using the following expression:

$$\Psi_p = 2mP/N + P/4LCM(P, N) - 2n + P/LCM(P, N)$$

wherein LCM(P, N) is a least common multiple between the P and the N, m and n are arbitrary natural numbers, and the $\Psi_p$ is a value larger than zero but smaller than one.

6. The method of determining a pole arc ratio of an interior permanent magnet rotary motor as defined in claim 5, wherein said each of said P permanent magnet magnetic pole sections has a pair of nonmagnetic flux barriers at both ends in a peripheral direction thereof;
   said flux barriers have a sectional profile having a plurality of corners as seen from one side in an axis direction of said rotor core;
   said pole arc ratio of said permanent magnet magnetic pole section is defined to be a ratio of θpp/θp where an angle between two line segments, each of which connects a center of said rotor core and one of said plurality of corners that is closest to a surface of said rotor, is indicated by the θpp and an angle obtained by dividing a full circumference angle (360°) of said rotor core by a number of said permanent magnet pole sections is indicated by the θp, and said pole arc ratio of said permanent magnet magnetic pole section indicated by $\Psi_p$ is determined by calculation using said expression.

7. The method of determining a pole arc ratio of an interior permanent magnet rotary motor as defined in claim 5, said interior permanent magnet rotary motor further comprising:
   a pair of grooves being formed close to both ends in a peripheral direction of said each of said P magnet magnetic pole sections, said pair of grooves extending in an axis direction of said rotor core and being opened in a surface of said rotor core;
   wherein said grooves have a sectional profile having a plurality of corners as seen from one side in an axis direction of said rotor core, said pole arc ratio of said permanent magnet magnetic pole section is defined to be a ratio of θpp/θp where an angle between two line segments, each of which connects a center of said rotor core and one of said plurality of corners that is located in said surface of said rotor core and adjacent to a corresponding one of said permanent magnet magnetic pole sections, is indicated by the θpp and an angle obtained by dividing a full circumference angle (360°) of said rotor core by a number of said permanent magnet pole sections is indicated by the θp, and said pole arc ratio of said permanent magnet magnetic pole section indicated by $\Psi_p$ is determined by calculation using said expression.

8. The method of determining a pole arc ratio of an interior permanent magnet rotary motor as defined in claim 5, wherein said pole arc ratio of said permanent magnet magnetic pole section $\Psi_p$ is a value in a range of a figure, obtained by rounding off the figure to three decimal places, ±2.2%, said value being obtained from said expression for determining the $\Psi_p$.

9. A method of determining a pole arc ratio of an interior permanent magnet rotary motor, said interior permanent magnet rotary motor comprising:
   a stator including a stator core having N slots and N magnetic pole sections (N: a natural number of 2 or more) arranged to be spaced at equal intervals in a peripheral direction thereof and exciting windings of at least two phases wound on said N magnetic pole sections; and
   a rotor having a rotor core and P permanent magnet magnetic pole sections (P: even number), said rotor rotating with respect to said stator;
   said P permanent magnet magnetic pole sections being formed within said rotor core to be spaced at equal intervals in a peripheral direction of said rotor core;
   each of said P permanent magnet magnetic pole sections being constituted from a permanent magnet embedded within said rotor core; and
   a ratio of the P to the N being set within the range of $2/3 \leq P/N \leq 43/45$ and $P_o$ of an irreducible fraction $P_o/N_o$ of the P/N being set to an odd number;
   wherein said pole arc ratio of said permanent magnet magnetic pole section indicated by $\Psi_p$ is determined by calculation using the following expression:

$$\Psi_p = 2mP/N + P/4LCM(P, N) - 2n$$

wherein LCM(P, N) is a least common multiple between the P and the N, m and n are arbitrary natural numbers, and the $\Psi_p$ is a value larger than zero but smaller than one.

10. The method of determining a pole arc ratio of an interior permanent magnet rotary motor as defined in claim 9, wherein said each of said P permanent magnet magnetic pole sections has a pair of nonmagnetic flux barriers at both ends in a peripheral direction thereof;
    said flux barriers have a sectional profile having a plurality of corners as seen from one side in an axis direction of said rotor core;
    said pole arc ratio of said permanent magnet magnetic pole section is defined to be a ratio of θpp/θp where an angle between two line segments, each of which connects a center of said rotor core and one of said plurality of corners that is closest to a surface of said rotor, is indicated by the θpp and an angle obtained by dividing a full circumference angle (360°) of said rotor core by a number of said permanent magnet pole sections is indicated by the θp, and said pole arc ratio of said permanent magnet magnetic pole section indicated by $\Psi_p$ is determined by calculation using said expression.

11. The method of determining a pole arc ratio of an interior permanent magnet rotary motor as defined in claim 9, said interior permanent magnet rotary motor further comprising:
a pair of grooves being formed close to both ends in a peripheral direction of said each of said P magnet magnetic pole sections, said pair of grooves extending in an axis direction of said rotor core and being opened in a surface of said rotor core;
wherein said grooves have a sectional profile having a plurality of corners, as seen from one side in an axis direction of said rotor core, said pole arc ratio of said permanent magnet magnetic pole section is defined to be a ratio of θpp/θp where an angle between two line segments, each of which connects a center of said rotor core and one of said plurality of corners that is located in said surface of said rotor core and adjacent to a corresponding one of said permanent magnet magnetic pole sections, is indicated by the θpp and an angle obtained by dividing a full circumference angle (360°) of said rotor core by a number of said permanent magnet pole sections is indicated by the θp, and said pole arc ratio of said permanent magnet magnetic pole section indicated by $\Psi_p$ is determined by calculation using said expression.

12. The method of determining a pole arc ratio of an interior permanent magnet rotary motor as defined in claim 9, wherein said pole arc ratio of said permanent magnet magnetic pole section $\Psi_p$ is a value in a range of a figure, obtained by rounding off the figure to three decimal places, ±2.2%, said value being obtained from said expression for determining the $\Psi_p$.

* * * * *

UNITED STATES PATENT AND TRADEMARK OFFICE
CERTIFICATE OF CORRECTION

PATENT NO. : 7,358,638 B2
APPLICATION NO. : 11/051530
DATED : April 15, 2008
INVENTOR(S) : Toshihito Miyashita et al.

It is certified that error appears in the above-identified patent and that said Letters Patent is hereby corrected as shown below:

On the Title Page, item 56, References Cited, Foreign Patent Documents, 4th Document, Delete "EP 1365338 12/2002", Insert --EP 1265338 12/2002--.

Column 10, Line 21, (Claim 1, Line 24), Delete "$\Psi_p=2mP/N+P/4LCM(P,N)-2n+kP/LGM(P,N)$", Insert --$\Psi_p=2mP/N+P/4LCM(P,N)-2n+kP/LCM(P,N)$--.

Signed and Sealed this

Twenty-ninth Day of July, 2008

JON W. DUDAS
*Director of the United States Patent and Trademark Office*